May 7, 1940.  M. KLAVÍK  2,200,177
MOUNTING OF AXLE SPRINGS IN AUTOMOBILES
Filed Feb. 4, 1939
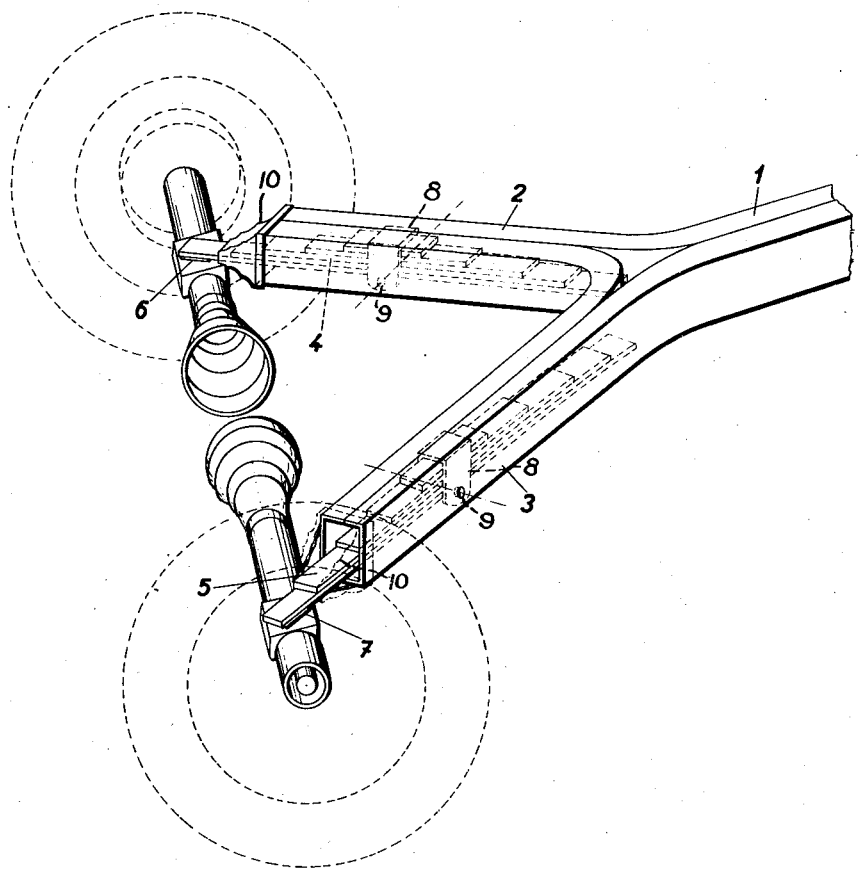

Patented May 7, 1940

2,200,177

UNITED STATES PATENT OFFICE 2,200,177

MOUNTING OF AXLE SPRINGS IN AUTOMOBILES

Miloš Klavík, Prague-Smichov, Czechoslovakia

Application February 4, 1939, Serial No. 254,702
In Czechoslovakia February 5, 1938

2 Claims. (Cl. 280—106.5)

This invention relates to the spring-mounting of rear floating half-axles in automobiles, more particularly those with motors at the rear.

In vehicles having motors at the rear, the end of the central member of the chassis is usually bifurcated in the form of the letter Y and in the fork thus formed the entire motor unit, that is to say the motor with the change-speed gear and the drive of the half-axles, is mounted.

According to the invention, the fork arms of the end of the central member are constructed hollow and are used for accommodating the leaf springs, which rest with one of their ends on a suitably constructed supporting surface of the half-axles in the vicinity of the road wheels.

A construction of the subject-matter of the invention is shown diagrammatically in perspective in the accompanying drawing, by way of example.

The central member 1 of the chassis is forked at the rearward end and each arm 2 and 3 of the said fork is constructed as a hollow body open at the end. In these hollow bearing members the leaf springs 4 and 5 are mounted in such a manner that their ends rest on the supports 6 and 7 arranged on the floating half-axles in the vicinity of the road wheels. The spring anchorages 8 are connected to the arms of the forks 2 and 3 by pins or the like 9.

In this manner the rear springs of the vehicle are satisfactorily mounted and protected against external influences particularly when the ends of the hollow arms of the bifurcated chassis fork are closed by resilient coverings 10, for example of rubber, leather or the like.

I claim:

1. In an automobile with a bifurcated central chassis member supporting the half-axles, leaf springs arranged inside the arms of the bifurcated chassis member, means on the half-axles for supporting the adjacent ends of the leaf springs and anchorages for said springs in said arms.

2. In an automobile with a bifurcated central chassis member supporting the half-axles, leaf springs arranged inside the arms of the bifurcated chassis member, means on the half-axles for supporting the adjacent ends of the leaf springs, anchorages for said springs in said arms and resilient coverings for the ends of said arms through which the springs extend.

MILOŠ KLAVÍK.